United States Patent
Egi et al.

(10) Patent No.: US 10,191,882 B2
(45) Date of Patent: Jan. 29, 2019

(54) METHOD AND SYSTEM FOR AGGREGATION-FRIENDLY ADDRESS ASSIGNMENT TO PCIE DEVICES

(71) Applicant: Futurewei Technologies, Inc., Plano, TX (US)

(72) Inventors: Norbert Egi, Santa Clara, CA (US); Thomas Boyle, Santa Clara, CA (US); Guangyu Shi, Cupertino, CA (US)

(73) Assignee: Futurewei Technologies, Inc., Plano, TX (US)

( * ) Notice: Subject to any disclaimer, the term of this patent is extended or adjusted under 35 U.S.C. 154(b) by 236 days.

(21) Appl. No.: 14/753,400

(22) Filed: Jun. 29, 2015

(65) Prior Publication Data

US 2016/0378706 A1    Dec. 29, 2016

(51) Int. Cl.
*G06F 13/20* (2006.01)
*G06F 13/42* (2006.01)
*G06F 13/40* (2006.01)

(52) U.S. Cl.
CPC ........ *G06F 13/4282* (2013.01); *G06F 13/404* (2013.01); *G06F 13/4022* (2013.01)

(58) Field of Classification Search
CPC . G06F 13/4022; G06F 13/4282; G06F 13/404
USPC ........................................................ 710/313
See application file for complete search history.

(56) References Cited

U.S. PATENT DOCUMENTS

| | | | |
|---|---|---|---|
| 7,584,375 B2 * | 9/2009 | Gutman | G06F 1/3209 713/300 |
| 2009/0077297 A1 | 3/2009 | Zhao et al. | |
| 2012/0137042 A1 * | 5/2012 | Wang | G06F 13/4022 710/313 |
| 2015/0026384 A1 * | 1/2015 | Maitra | G06F 13/4022 710/313 |

FOREIGN PATENT DOCUMENTS

CN        101242371        8/2008

OTHER PUBLICATIONS

"International Application No. PCT/CN2016/087187, International Search Report dated Oct. 9, 2016", (Oct. 9, 2016), 4 pgs.

* cited by examiner

*Primary Examiner* — Chun Kuan Lee
(74) *Attorney, Agent, or Firm* — Schwegman Lundberg & Woessner, P.A.

(57) ABSTRACT

A peripheral component interconnect express PCI-e network system having a processor for (a) assigning addresses to the PCI-e topology tree, comprising: traversing, at a given level and in a breadth direction, down-link couplings to an interconnection; ascertaining, at the level, which of the down-link couplings are connected to nodes; assigning, at the level, addresses to nodes of ascertained down-link coupling having nodes; and (b) propagating, a level, comprising: traversing, at the level and in a depth direction, down-link couplings to the interconnection of the PCI-e network, ascertaining, at the level, which of the downlink couplings are coupled to other interconnections in the depth direction, consecutively proceeding in the depth direction, to a next level of the down-link coupling of a next interconnection; and alternatively repeating (a) and (b) until the nodes are assigned addresses within the PCI-e tree topology network.

17 Claims, 6 Drawing Sheets

Address assignment to both sides of an NTB interconnecting two sub-networks

METHOD AND SYSTEM FOR AGGREGATION-FRIENDLY ADDRESS ASSIGNMENT TO PCIE DEVICES

CROSS REFERENCE TO RELATED APPLICATIONS

This application is related to the commonly owned, patent application, U.S. Ser. No. 13/793,263, entitled "WIRE LEVEL VIRTUALIZATION OVER PCI_EXPRESS," with filing date Mar. 11, 2013, the entirety of which is incorporated by reference.

FIELD OF THE INVENTION

Embodiments of the present invention generally relate to the PCI-Express architecture, particularly for data center interconnect technology.

BACKGROUND OF INVENTION

PCI-Express (PCIe) is the successor of the PCI (Peripheral Component Interconnect) technology which is the most widely used interconnect standard between processors, e.g., CPUs, and their peripherals deployed within desktop computers and servers. The PCI bus is well regarded for its high throughput, low-latency, packet-based and switched interconnection technology.

PCIe is a serial connection that operates more like a network coupling than a serial bus interface. For instance, instead of one bus that handles data from multiple sources, the PCIe bus has a switch that controls several point-to-point serial connections. These connections are multiplexed out from the switch and connect directly to devices where the data is to be sent. Every device has its particular dedicated connection, so devices no longer share bandwidth, which is different from normal bus operations.

Currently, PCIe is mostly deployed within single enclosure machines (e.g., servers and PCs) and primarily at the level of the printed circuit board (PCB). With all its attributes and advantages, PCIe can clearly become a flexible and cost efficient alternative to current data center interconnect technologies, such as Ethernet (ETH) and InfiniBand (IB).

With the development of multi-processor devices, there is a need for better memory utilization particularly with respect to address allocation space. Initially, when a host device is powered up, it is not aware of the system topology, so it performs discovery to learn what devices are present and how to map them in its memory space. To support standard discovery and configuration software, the PCI specification defines a standard format for the control and status registers. With multi-processors, system designers developed end points with their own native processors built-in. This practice causes a problem in that both the host processor and the intelligent adapters in PCIe (upon power up) would attempt to enumerate the entire system thereby causing system conflicts and may ultimately result in a non-functional system. As a result, non-transparent bridges (NTB) were developed which appear as endpoints to the discovery processes, thereby eliminating these software conflicts.

In light of the above descriptions, with more sophisticated node topologies, there is a need for better intelligent discovery mechanisms to map address spaces more efficiently. More specifically, with the advent of NTB bridges, there is a need to translate addresses from one memory space to another, hence any optimization of address allocation in the discovery stage would provide for a more overall robust and reliable PCIe architecture.

SUMMARY

Embodiments of the present invention relate to assigning memory addresses to PCIe devices in such a manner that enables efficient aggregation of the devices into a single address with a single translation register and which substantially minimizes overhead associated with memory address usage. Embodiments of the present invention describe a unique method for addressing node addresses that enable optimum address aggregation capability between the addresses.

An embodiment of the invention provides a peripheral component interconnect express PCI-e network system that has a processor which implements a method for assigning addresses to nodes of a topology tree of the PCI-e network. Addresses are assigned to the PCI-e topology tree. This can be performed by traversing (at a given level and in a breadth direction) down-link couplings to an interconnection of the PCI-e network then ascertaining (at the level) which of the down-link couplings are connected to nodes and then assigning (at the level) addresses to nodes of ascertained down-link couplings having nodes. The method includes propagating a level of the PCI-e topology tree. This is performed by traversing, (at the level and in a depth direction) down-link couplings to the interconnection of the PCI-e network and ascertaining (at the level) which downlink couplings are coupled to other interconnections in the depth direction and then consecutively proceeding (in the depth direction) to a next level of the down-link couplings of a next interconnection. The method includes repeating the address assignment and propagation processes alternatively until all the nodes are assigned addresses within the PCI-e tree topology network.

A further embodiment of the invention provides a peripheral component interconnect express PCI-e network system using non-transparent bridging (NTB) for extra connections in its topology tree. The NTB performs a method including: allocating a first set of addresses to a node of a first address in a sub-tree with a first interconnection switch as a root; allocating a second set of addresses to a node of a second address in a sub-tree with a second interconnection switch as a root; programming a single address of the first address in a translation register with addresses of a first address and a corresponding first set of addresses of the sub-tree of the first interconnection; programming a single address of the second address in a translation register with addresses of a second address and a corresponding second set of addresses of the sub-tree of the second interconnection; and translating packet addresses, via the programmed register, of packets arriving on either side of the NTB between the first and second interconnections to either the first or second addresses of the sets of first and second addresses.

A further object of the present invention is to provide a method and system for enabling redundancy by allocating sets of addresses to the NTB downlink connections to enable a redundant downlink connection between interconnections of the topology tree.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Figure 1:
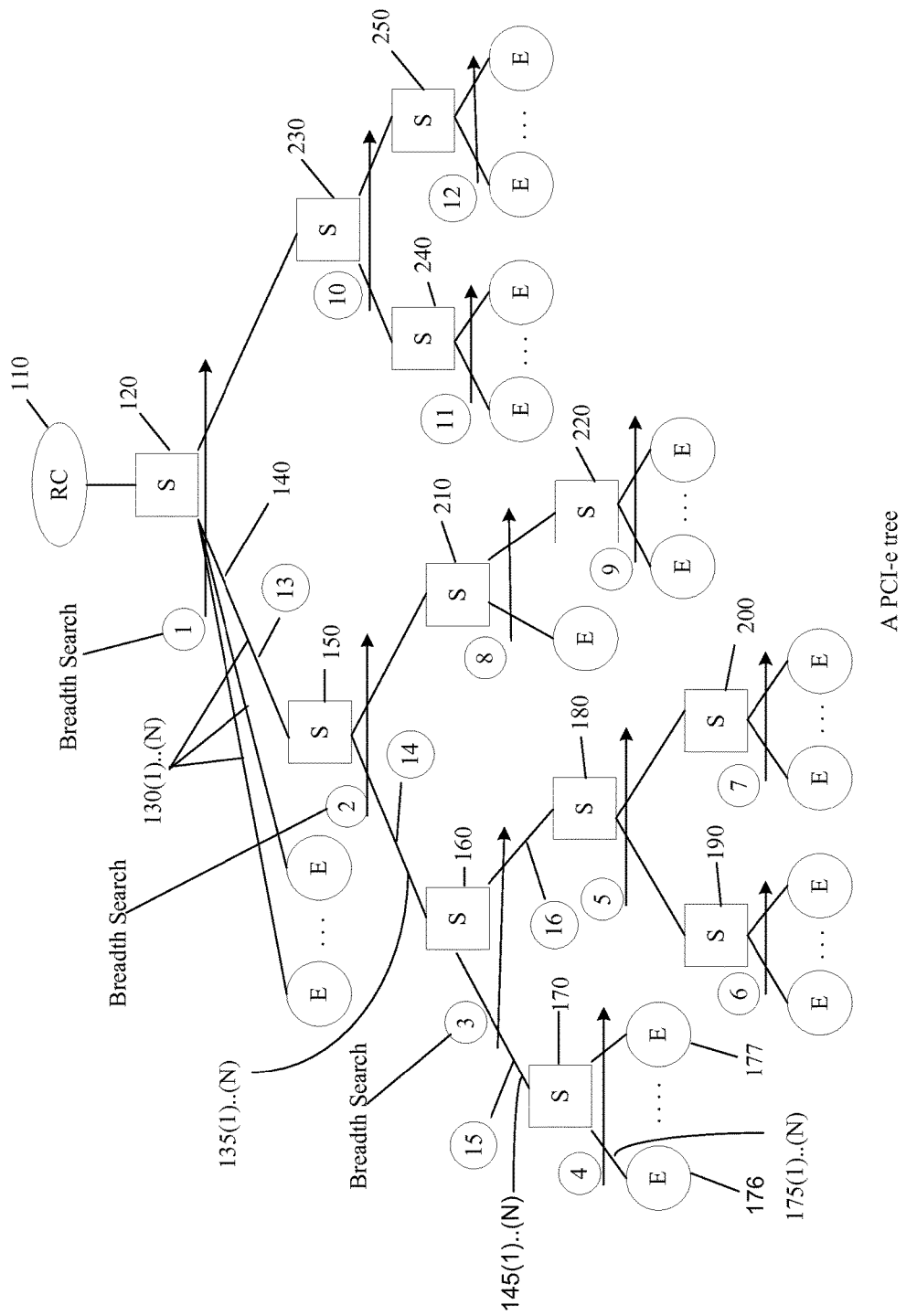
FIG. 1 is a schematic diagram of the architecture employing a PCI-e interconnection showing the alternating steps of the address allocation process, according to embodiments of the present invention.

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, components, and circuits have not been described in detail as not to unnecessarily obscure aspects and features of the subject matter.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "writing," "including," "storing," "transmitting," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

PCIe technology provides hardware level resource sharing with a large set of different PCIe-based Input/Output (I/O) devices supporting this technology. The technology itself is so widely used within servers, that the majority of the latest CPUs already have PCIe built into the chip, therefore not requiring any additional chipsets to be connected between the CPU and the peripherals. With this, clusters or data centers based on a PCIe interconnect would achieve greatly improved cost efficiency, due to the lower number and types of components needed in the system. In addition, compared to ETH and IB, the power consumption of PCIe switches is several times lower (per Gbps) thereby further contributing to the cost efficiency of such a system.

As per functionality, besides hardware-level resource virtualization, PCIe also provides RDMA (Remote Direct Memory Access) functionality, making it a viable solution for high-speed, low-latency CPU-to-CPU communication. PCIe also uses built-in credit-based flow-control, providing reliable data transfer at the hardware level, thereby requiring a much "slimmer" software stack. The technology also supports cabling for the network to span larger distances and is flexible enough to support different network topologies. There are several well-proven solutions with low cost adapters and cables, making PCIe a potential, cost-efficient interconnect standard for data centers.

The following Table 1.0 summarizes some of the key attributes of PCI-Express compared to that of Ethernet and InfiniBand.

TABLE 1.0

|  | Ethernet | InfiniBand | PCIe |
| --- | --- | --- | --- |
| Bandwidth (Gbps) | 10/40/100 | 2-300 | 8-256 |
| Latency (ns) | 200-300 | 160 | 120 |
| Scalability | Unlimited | $O(10^3)$ | up to 64K |
| Reliable transfer | x | ✓ | ✓ |
| RDMA | iWARP/RoCE | ✓ | ✓ |
| Inter-chassis | ✓ | ✓ | ✓ |
| I/O virtualization | x | x | ✓ |

Another advantage of the technology is that its standardization organization (e.g., PCI-SIG) only defines the protocol and packet formats, but vendors implementing the technology are free to implement any functionality inside their devices (e.g., switches, end-points, etc.) which provides a great level of flexibility and potential for supporting different functionalities for applications missing from other data center interconnection technologies. With all the above mentioned attributes, it is appreciated that PCI-Express can be described as a Unified Interconnect for all types of communications required within a data center among all the components.

PCI-Express is an emerging data center interconnect technology with vast potential. More and more dominant companies providing IT solutions are researching and adopting PCI-Express for more than just an interconnect between CPU(s) and peripherals within a single server. The PCIe technology was originally designed as an onboard interconnection technology with only several nodes (CPUs and I/O devices) connected to a PCIe network. These networks typically consisted of a single PCIe switch. However, the technology itself is capable of becoming a large-scale interconnection network, but several challenges have to be addressed to make it functional. Embodiments of the present invention describe a unique method for addressing node addresses that enable optimum address aggregation capability between the addresses.

The ability to aggregate addresses in a topology of networked nodes becomes critical when (1) a short cut methodology, such as Non-Transparent Bridges (NTB), is used for extra redundant connections in the PCIe network and further when (2) the number of I/O devices accessed by a CPU through an NTB (the typical approach of allowing multiple CPUs to be connected to a PCIe network) exceeds the number of Base Address Register (BARs) in the NTB (typically 2 to 5). In other words, when scaling a network of connected nodes that results in higher numbers of connected devices, than available BARs, the embodiments of the present invention provide solutions that allow a convenient addressing aggregation for connecting the CPUs to the PCIe network.

An embodiment of the present invention includes an address allocation scheme where the addresses that are allocated to end-nodes of the network can be globally contiguous. In other words, the individual addresses do not need to be side-to-side or close in proximity but can be virtually addressed as such. The term "contiguous" is used loosely to mean that the boundaries of adjacent addresses do not necessary have to be interconnected, but adjacent addresses need only be as close to each other as is possible based on the constraints of the PCIe address calculation scheme. In order to comply with the PCIe standards, the beginning of an address has to be an exponent of 2 (e.g., power of 2), but the address can be of any length. When the length of an address is not a power of 2, the start point of the address of the following device (or adjacent device) is not immediately after the end of the previous address. However, the next or adjacent address start point is generally started as closely after the previous address endpoint as possible. This start point of the next address would be the closest address point that equals to a power of 2.

Additionally, the term "globally contiguous" addresses describes not only addresses of devices connected to the same switch as contiguous, but all the devices in any sub-network of the entire PCIe network that have contiguous addresses. This means that within any part of the network of the global PCI network, the devices left in this sub-network have contiguous addresses that would be allocated to them.

This "globally contiguous" address assignment is achieved by a combined breadth-first-depth-first tree traversal process. The process is operational within a processor and is illustrated in FIG. 1. In FIG. 1, there is shown root node "RC" (110) connected to switch "S" (120) having downlinks [0 . . . N] (130), downlink (140) coupled to port switch (120) and switch (150). FIG. 1 shows breadth searches (1) . . . (12) across the nodes of the related switches (120) to (250). The tree is traversed from its root node (RC) taking alternating breadth-first steps (1) . . . (12) and then depth-first steps (13), (14), (15) etc. At the first level of switch (120) the process enumerates all the down-links (130) sub (1) to (n) of the switch (120) from 0 to N in step (1), and allocates addresses contiguously to the end-nodes (if there are any) that are connected to this switch. In this case, end nodes (135) sub (1) to (n) are allocated with addresses. The allocation of an address is performed with respect to every end-node (130') sub (1) to (n) connected to this top level switch, and done in a contiguous manner from port 0 to N. In this allocation step (1), it is irrelevant as to which port that an end-node is connected to and whether a device connected to its adjacent port is an end-node or a switch. Every end-node connected to a down-link (130) sub (1) to (n) is allocated an address. Exemplary pseudo-Code of the process described above is as follows:

```
procedure ENUMERATE(S, A):
    __switches__ = 0;//array to store switches (local variable)
    check every down link connection:
        IF a device is connected to the down link:
            assign an address range A' to device (as specified by the device) as close to A as possible;
            A = end of address range A';
            store A' with associated device;
//optional
        ELSE IF another switch is connected to the down link:
            add down link switch to __switches__;
        ELSE //i.e. the link is unconnected
            do nothing;
    for every __sw__ in switches:
        ENUMERATE(__sw__, A);
    return 0;
main:
    __address__ = beginning of PCIe address space;
    __S__ = first switch connected to root complex;
    ENUMERATE(__S__, __address__);
```

Once all the down-links with end nodes are allocated addresses, the process then takes a depth-first step where it traverses the tree down via the switch (150) connected to the first port of the top switch (120). In this case, the initial case of FIG. 1, this means that the down-link or depth step (2) is performed from switch (120) to switch (150) after all the down-links (130) sub (1) to (n) have been processed and addresses assigned to the end nodes. At the second step, switch (150) has down-links (135) sub (1) to (n). Downlinks (135) sub (1) and (135) sub (2) are not assigned addresses as there are no endnotes connected thereto and the process proceeds to step (3) to switch (160). Downlinks (145) sub (1) and (145) sub (2) are not assigned addresses as there are no end nodes connected thereto and the process proceeds to step (4) to switch (170).

Here the process assesses down-links (175) sub (1) to (n) and allocates addresses beginning from the downlink coupled to the first end node (176) which is assessed initially, addressed, and then the subsequent downlink coupled to the second node (177) is assessed and allocated an address. At this step (4) there are no more available downlinks coupling switches to switches. For example, switch (170) has no down-links coupled thereto, therefore the process takes a recursive step and proceeds one level back to switch (160) and proceeds to the next available down-link coupled to switch (160) which is coupled to switch (180). At this point, the process repeats the alternative allocation process of breath-first to allocate addresses to all the end nodes coupled to all the downlinks and then proceeds to an available port or downlink coupled to a switch (190) which is the downlink from switch (180) to switch (200). Once all the end nodes are allocated addresses in a particular branch of downlinks, the process, proceeds back to each former level. In this case, once step (7) is completed and the downlinks for both end nodes in switch (200) are allocated addresses, the process proceeds, up to level (5) or switch (180).

Since all downlinks are allocated addresses and there are no more available downlinks, the process proceeds to step (3) where a similar result occurs of all the downlinks being allocated addresses, hence the process proceeds to step (2). At step (2), the process is able to process the downlink or port coupled to switch (210). Hence, at step (2), the process then proceeds to step (8) and subsequently to step (9). Once both steps (8) and (9) are processed and the addresses are allocated, the process proceeds up a level and back to step (2). Since all the end nodes are processed and there are no other downlinks coupled to any other switches, the process then proceeds to step (1). The process therefore incrementally (level by level) checks to make sure that all the downlinks coupled to switches have been properly processed. This level-by-level methodical review of each available downlink associated with each level prevents any branches (of end nodes) from being missed or left out of the address allocation process.

Figure 2:
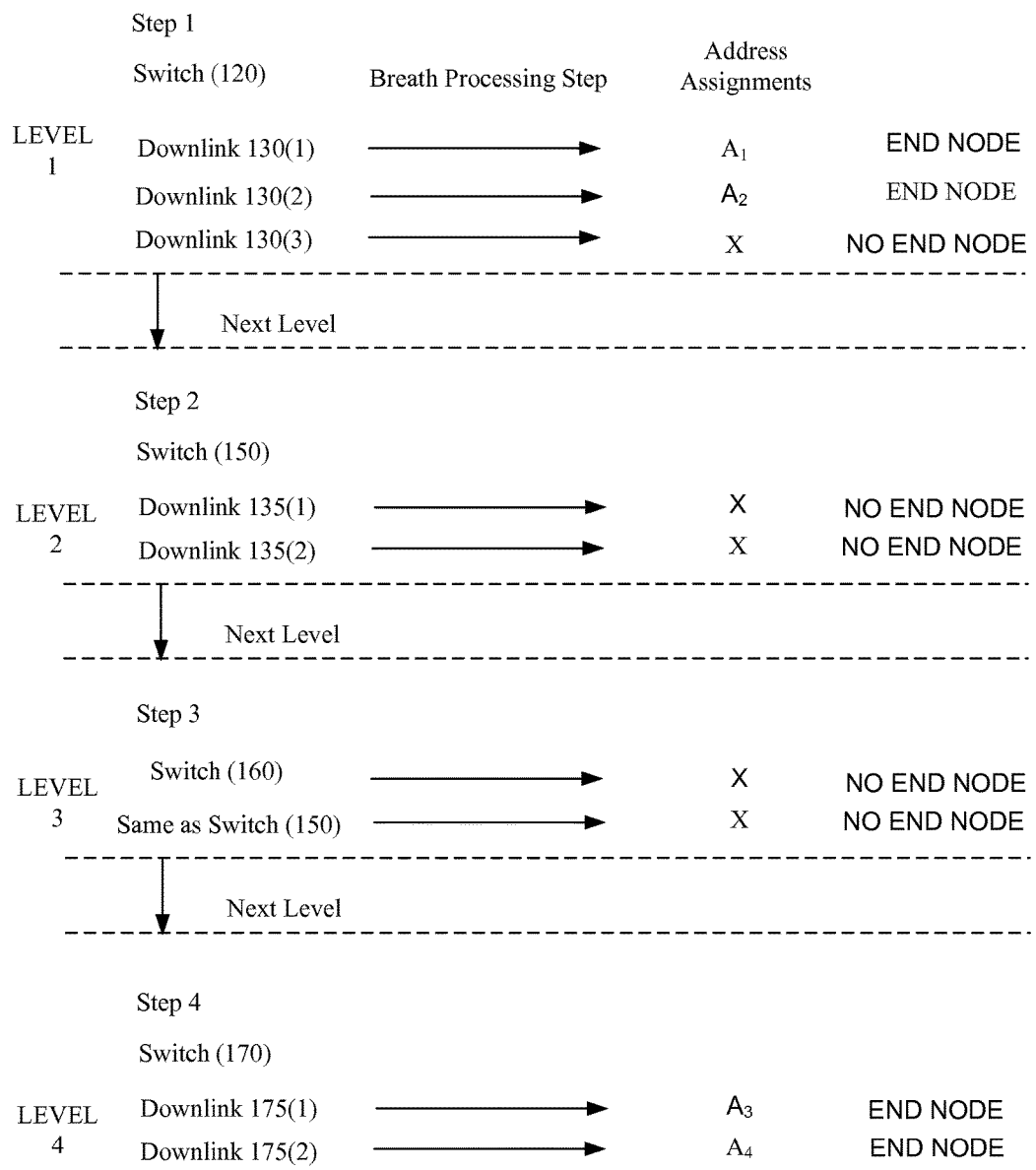
FIG. 2 is a tabular diagram that shows the address allocation according to each step of the process of the PCI-e tree, according to embodiments of the present invention.

In FIG. 2. there is shown the address allocation technique according to the tree topology address assignment in FIG. 1. In FIG. 2, there is shown the address allocation process with reference to the enumerated steps. In step (1) of FIG. 1, there are two end nodes coupled to downlinks (130) (1), (2) and hence two address allocations. In Step 2, there are no end nodes to the downlinks associated with switch (150) and so there are no address allocations. In step (3) of FIG. 1, again there are no end nodes associated with the downlinks coupled to switch (160). In step 4, there are two downlinks associated with switch (170) hence addresses are allocated to the table in FIG. 2. There, the addresses filled in the table are ordered in the breath-and-down alternating pattern with the downlinks in only those steps which have available end nodes having addresses associated therewith.

Figure 3:
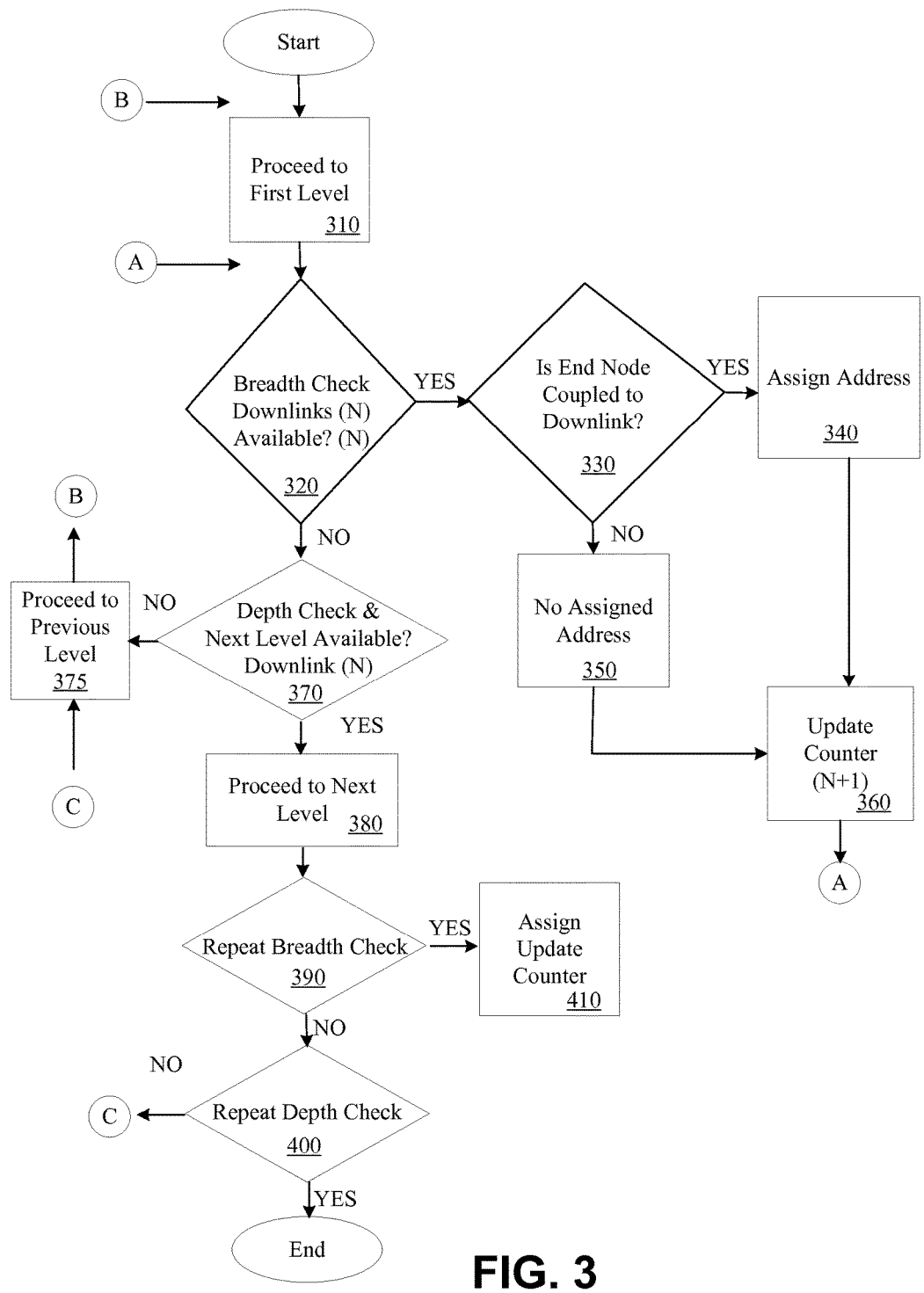
FIG. 3 is a flowchart of the breadth-depth flow and depth-flow-recursive alternative routine, according to an embodiment of the present invention.

FIG. 3, shows a flowchart of an exemplary process for processing the end nodes of the topology of FIG. 1. In FIG. 3, at block (300) the process proceeds from the RC to the first coupled switch (120) of FIG. 1. At switch (120), step (1) is performed using a left-to-right processing technique for the downlinks and a determination is made if there are end nodes coupled to the downlinks. If the first processed downlink (block 320) has an end node coupled to it "yes" (block 330) then addresses are allocated to the first downlink end nodes (block 340) and the process proceeds to next consecutive downlink (block 360), and if "no" (block 350) the next consecutive downlink (block 360) end node of the level is processed until all the downlinks are processed. Once all are processed, a depth check is performed (block 370) and the process proceeds to the next level if there is a downlink at the next level (block 380) and otherwise it proceeds to the previous level (block 375). Again, all the downlinks are consecutively processed. These breadth checks (390) and depth checks (400) are repeated until all the downlinks are processed and addresses are assigned. If the breath check indicates there is a new depth level an update counter is assigned. If there are no end nodes or no downlinks left coupled to other switches, then the process proceeds back up a level back to block (375) and looks for available downlinks to switches. This process is repeated until all levels are processed and all downlinks are processed. The process then returns to the start or first level (310).

Figure 4:
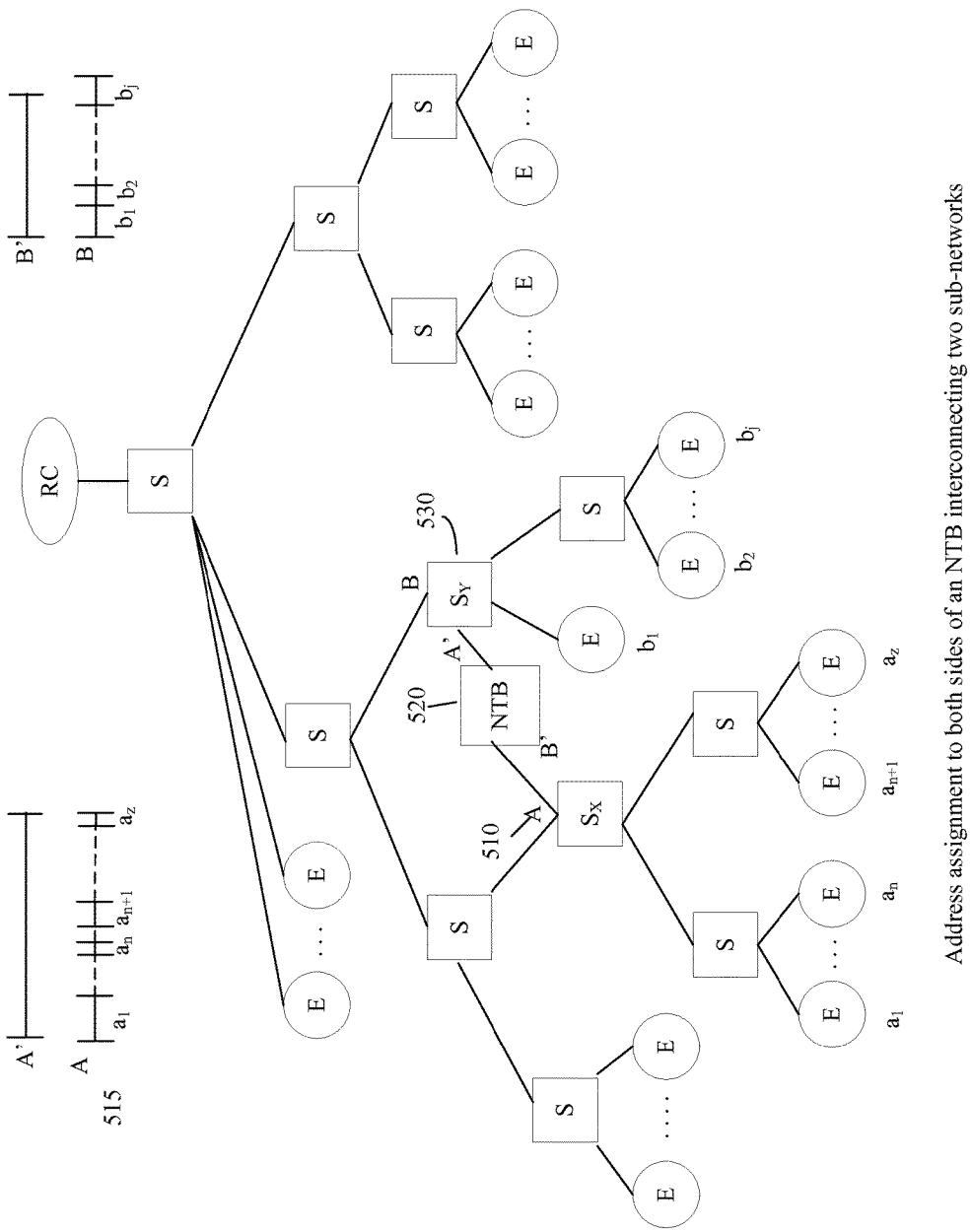
FIG. 4 is a schematic diagram of proposed traversal of the PCI-e tree, according to embodiments of the present invention.

FIG. 4. Shows a non-transparent bridging NTB (520) coupled to switches Sx (510) and Sy (530). A non-transparent bridge is functionally similar to a transparent bridge, with the exception that there is an intelligent device or processor on both sides of the bridge, each with its own independent address domain. In an embodiment of the present invention, the process described above ensures that the addresses given to end-nodes in any given sub-tree comprise a contiguous address range seen through the uplink of the top-most switch of the sub-tree. This property is important and advantageous when NTBs are used in the PCIe network and provide extra connections built-in for redundancy and for topology extension (e.g., extending the topology from a basic tree to something more complex and efficient for large numbers of nodes such as fat-tree or CLOS). This way, the concatenated addresses of all the devices in that sub-tree are optimized with respect to length. In other words, the embodiment wastes no addresses, and can simply be accessed via a single base address register BAR in the NTB with an equal address length allocated to the NTB.

FIG. 4 shows how the address assignment to NTBs creates redundant connections and takes advantage of the efficient address assignment of end-nodes. In this example, addresses a1, . . . , az (515) are allocated to the end-nodes in the sub-tree with switch SX (510) as the root, and addresses b1, . . . , bj (535) are allocated to end-nodes in the sub-tree with switch SY (530) as the root. Addresses a1, . . . , az (515) collectively constitute address A, which can be seen through switch SX (510). The "start address" of A equals that of a1 (515) and the "end address" equals that of az. Similarly, this is the case with addresses B and b1, . . . , bj (535).

In order to access the sub-network stemming from switch Sx through the NTB (520), an address needs to be assigned to the base address registers BAR on the opposite side of the NTB (520) having the same length as address A, which is marked with address A'. And a single address translation register needs to be programmed with addresses A and A' as address A being the translated address of address A' for packets arriving from the SY side of the NTB {520). Vice versa, for the other direction, B' will be translated to B when the sub-tree originating from SY is accessed from the opposite side of the NTB (520) (e.g., from the direction of where SX is residing).

It is appreciated that addresses A and B are of minimal length, and addresses A' and B' assigned to the two sides of the NTB (520) are also going to be minimal length. Therefore, the addresses used up in the PCIe network's address space are ultimately going to be minimal too.

Figure 5:
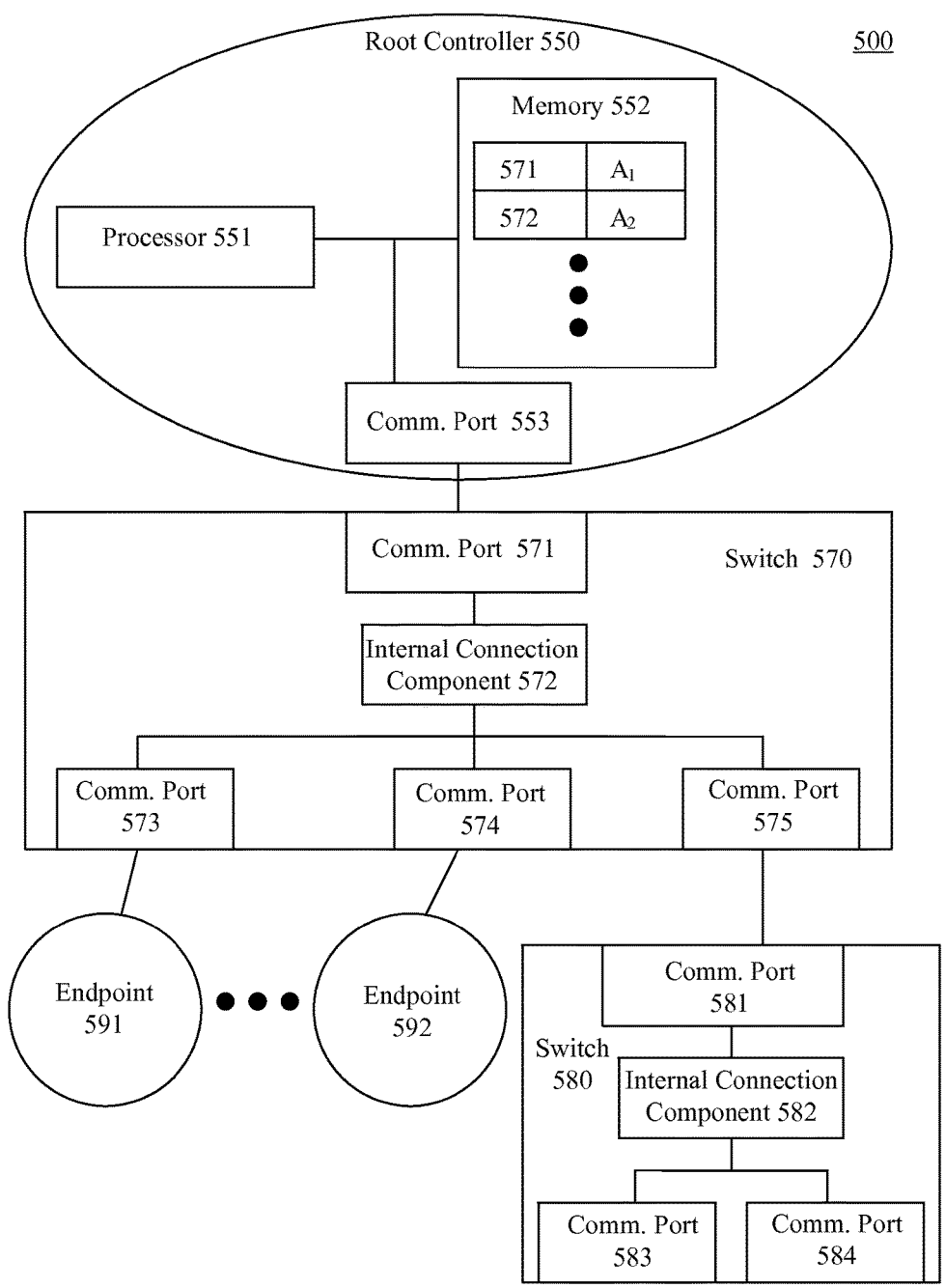
FIG. 5 is a block diagram of a portion of network or system 500 in accordance with one exemplary embodiment.

FIG. 5 is a block diagram of a portion of network or system 500 in accordance with one exemplary embodiment. Network 500 includes root node or root controller "RC" (550), switches 570 and 580 and end nodes or endpoints 591 and 592. Root controller "RC" (550) is communicatively coupled to switch 570 which in turn is communicatively coupled to switch 580 and end node or endpoints 591 and 592. Root controller 550 includes processor 551, memory 552 and communications port 553. Switch 570 includes internal connection component 572 and communication ports 571, 573, 574 and 575. Switch 580 includes internal connection component 582 and communication ports 581, 583, and 584.

The components of network 500 cooperatively operate to communicate and process information. Root controller 550 controls communications through the network including assigning addresses to components in network 500. Switches 570 and 580 communicate information to other components in network 500. Endpoints 591 and 592 perform various information processing operations.

In one embodiment, root controller 550 includes processor 551, memory 552 and communication port 553. Processor 551 directs operations associated with assigning addresses to nodes (e.g., end nodes, switches, non transparent bridges, etc,) of network 500. Root controller 550 assigns an address in a manner that facilitates aggregation of some nodes or devices into a single address. The process or method can be similar to the operations set forth in FIG. 3.

The method can comprise a first set of operations that assign addresses to a PCI-e topology tree (e.g., at each level, etc.). The first set of operations includes traversing, at a level and in a breadth direction, down-link couplings to an interconnection of the PCI-e system; ascertaining or determining, at the level, which of the down-link couplings are connected to nodes; and assigning addresses, at the level, to nodes of ascertained or determined down-link couplings that have end nodes or endpoints. The method can also comprises a second set of operations that propagate a level of the PCI-e topology tree or system. The second set of operations include traversing, at the level and in a depth direction, down-link couplings to the interconnection of the PCI-e system; ascertaining or determining, at the level, which of the downlink couplings are coupled to other interconnections in the depth direction; and consecutively proceeding, in the depth direction, to a next level of the down-link coupling of a next interconnection. The method can further include alternatively or alternately repeating the first set of operations and the second set of operations until the nodes are assigned addresses.

In one exemplary implementation, the interconnection comprises one of a switch and a port for coupling downlinks. The level comprises an initial level of the interconnection coupled to a root connection of the topological tree. The next level includes one of an upper and a lower level of a next interconnection. The assigning and the propagating performed on nodes commencing at a first level and ending at the first level results in address assignment for tree branches of the topological tree. The alternatively or alternately repeating results in a substantially minimal allocation of address space and prevents gaps in address space (e.g., by resulting in consecutive address assignments being assigned for nodes, etc.).

Executing the address assignment method can include communicating with other components in network 500. The root controller 550 can communicate with downstream components via communications port 553. The communication ports 571, 573, 574 and 575 of switch 570 communicate information to and from port 553, endpoint 591, endpoint 592 and communication port 581 respectively. Internal connection component 572 communicates information between communication ports 571, 573, 574 and 575. The communication port 581 of switch 580 communicate information to and from port 575. Communication ports 583 and 584 communicate information to and from other network components (not shown). Internal connection component 582 communicates information between communication ports 581, 583, and 584. It is appreciated that other switches with configurations different from 570 and 580 (e.g., having additional communication ports, etc.) can be utilized.

In one embodiment, components of network 500 are similar to components illustrated in FIG. 3. For example, root node 550 is similar to root node 110, switch 570 is similar to switch 120, end nodes 591 and 592 are similar to end nodes 130 and 140, switch 580 is similar to switch 150 and so on. It is appreciated that additional components (not shown) can be coupled to switches 570 and 580 (e.g., similar to switches 160, 180 and 210 coupled to switch 150, switch 230 coupled to switch 120, etc.).

After end node or endpoint addresses are assigned, processor 551 of RC 550 proceeds to assign network addresses to other nodes, including switches, a non transparent bridge (NTB), and so on. A NTB (not shown) can include additional downlink connections between interconnections of the topology tree. The NTB can be similar to the NTB included in the illustration of FIG. 4. In one embodiment, the NTB includes a first interconnection component and a second interconnection component. Root node or root controller (e.g., RC 550) assigns an address to the first interconnection component and another address to the second interconnection component. The addresses assigned to the non-transparent bridge can be similar to the A' and B' illustrated in FIG. 4. Allocating addresses to the NTB downlink connections can enable a redundant downlink connection between interconnections of the topology. The NTB can be positioned between a first and a second interconnection, wherein the first and second interconnections are not previously coupled via downlink couplings.

Figure 6:
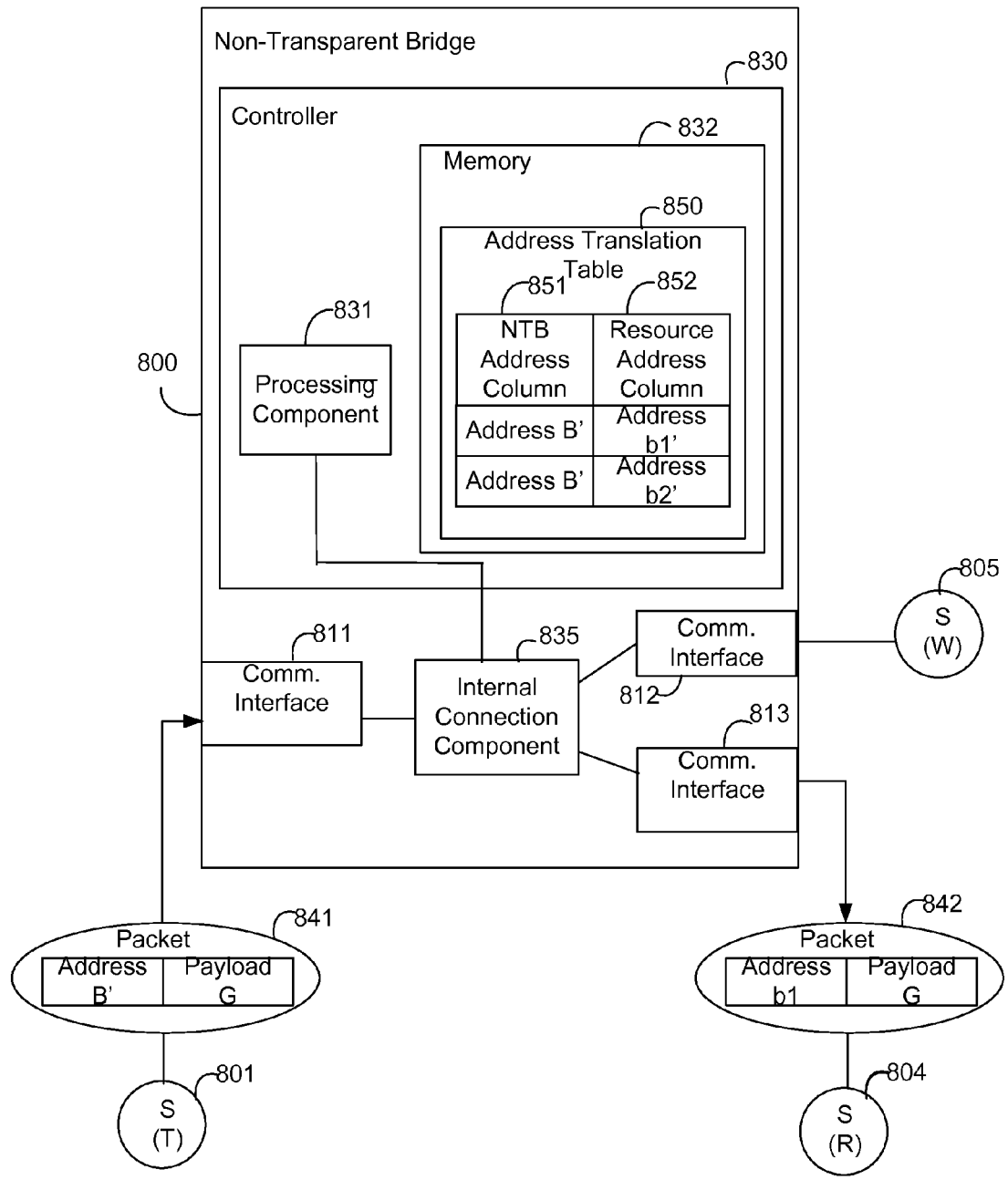
FIG. 6 is a block diagram of exemplary non-transparent bridge 800 in accordance with one embodiment.

FIG. 6 is a block diagram of an exemplary non-transparent bridge (NTB) 800 in accordance with one embodiment. Non-transparent bridge 800 can implement a non-transparent bridge configuration process and communication process. In one embodiment, non-transparent bridge 800 is similar to non-transparent bridge 220. Non-transparent bridge 800 includes ports 811, 812 and 813, internal connection component 835, and controller 830 which includes processing component 831 and memory 832. Ports 811, 812, and 813 receive and transmit communications and can be implemented in various ways (e.g. communication ports, input/output terminals, etc.). Internal connection component 835 selectively couples the ports 811, 812, and 813 to one another. Controller 830 controls the internal connection component 835. In one embodiment, memory 832 stores instructions and data (e.g., address translation tables, etc.) for performing various operations (e.g., including non-transparent bridge circuit configuration operations, internal connection control operations, etc.), and processing component 831 implements the instructions. Processing component 831 is operable to direct translation between addresses associated with communications, wherein the translation includes translating between at least one address that at least one device considers an end-point address and an address of at least one other device and the communications are forwarded in accordance with the translation.

Non-transparent bridge 800 is coupled to various other components or resources including switches 801, 804, and 805. Non-transparent bridge 800 is associated with or assigned at least one pair of end-point addresses (e.g., address A' and address B'). Memory 832 stores an address translation table 850. In one exemplary implementation, memory 832 can include base address registers. Address translation table 850 includes NTB address column 851 and resource address column 852. NTB address column 851 includes a portion of NTB address B' corresponding to resource address b1 (shown in column 852). NTB address column 851 also includes another portion of NTB address B' corresponding to resource address b2 (shown in column 852). Data packet 841 is received from communication port 811. The processor 831 directs removal of address B' from the packet 841 and uses the address translation table to look up a mapping of the address B' to address b1, which is attached to payload G to form data packet 842. Data packet 842 is forwarded from port 813 to switch 804 in accordance with address b1. Similarly, data packets can be communicated from switch 804 to switch 801 using addresses A' and portions of address space A (e.g., a1, a2, etc.). Switches 801 and 804 can be associated with or assigned addresses A and B respectively and are upstream of addresses a1 through az and b1 through bj respectively. Data packet 841 is sent from switch 801 to non-transparent bridge 800 and data packet 842 is sent from non-transparent bridge 800 to switch 804.

In one embodiment, NTB 800 performs operations associated with facilitating extra connections in a topology tree of a peripheral component interconnect express (PCI-e) system. A first set of addresses (e.g., A, a1 through az, etc.) are allocated to a node switch of a first address in a sub-tree with a first interconnection switch (e.g., 801, 180, 510, etc.) as a root. A second set of addresses (e.g., B, b1 through bj, etc.) are allocated to a node of a second address in a sub-tree with a second interconnection switch (e.g., 804, 210, 530, etc.) as a root. The operations include programming a single address of the first address in a translation register with addresses of a first address and a corresponding first set of addresses of the sub-tree of the first interconnection. The operations also include programming a single address of the second address in a translation register with addresses of a second address and a corresponding second set of addresses of the sub-tree of the second interconnection. Using the registers, addresses of packets arriving on either side of the NTB are translated between the first and second interconnections to either the first or second addresses of the sets of first and second addresses. The NTB can include sets of addresses of substantially minimal length.

It is appreciated processing components 551 and 831 (e.g., a central processing unit (CPU), an application specific integrated circuit (ASIC), a processing circuit, etc.) and memories 552 and 832 (e.g., a random access memory, a flash memory, a cache, etc.) can have various configurations and implementations.

Embodiments of the present invention are thus described. While the present invention has been described in particular embodiments, it should be appreciated that the present invention should not be construed as limited by such embodiments, but rather construed according to the following claims.

What is claimed is:

1. A peripheral component interconnect express (PCI-e) system comprising:
    a processor operable to perform a method of assigning addresses to nodes of a topology tree of the PCI-e system, comprising:
        (a) assigning addresses to the PCI-e topology tree, said (a) comprising:
        traversing, at a level and in a breadth direction, down-link couplings to an interconnection of the PCI-e system;
        ascertaining, at the level, which of the down-link couplings are connected to nodes, and incrementing an update counter based on detection of an additional depth level; and
        assigning contiguous addresses, at the level, to nodes of ascertained down-link couplings that have nodes;
        (b) propagating the level of the PCI-e topology tree, said (b) comprising:
        traversing, at the level and in a depth direction, down-link couplings to the interconnection of the PCI-e system;
        ascertaining, at the level, which of the down-link couplings are coupled to other interconnections in the depth direction; and
        consecutively proceeding, in the depth direction, to a next level of down-link coupling of a next interconnection; and
        (c) repeating alternately (a) and (b) until the nodes are assigned addresses, wherein, if there are no down-link couplings at the level, proceeding up to a previous level based on the update counter to ascertain additional down-link couplings.

2. The PCI-e system of claim 1, wherein (c) results in consecutive address assignment for nodes and wherein the consecutive address assignment prevents gaps in address space.

3. The PCI-e system of claim 1, wherein (c) results in a substantially minimal allocation of address space.

4. The PCI-e system of claim 1, wherein the interconnection comprises one of a switch and a port for coupling downlinks.

5. The PCI-e system of claim 1, wherein the next level comprises one of an upper and a lower level of a next interconnection.

6. The PCI-e system of claim 1, wherein the level comprises an initial level of the interconnection coupled to a root connection of the topology tree.

7. The PCI-e system of claim 1, further comprising:
    a non-transparent bridge (NTB) comprising additional downlink connections between interconnections of the topology tree.

8. The PCI-e system of claim 7, further comprising:
    enabling a redundant downlink connection between interconnections of the topology tree by allocating addresses to the NTB downlink connections.

9. The PCI-e system of claim 7, wherein the NTB is positioned between a first and a second interconnection and wherein further the first and second interconnections are not previously coupled via downlink couplings.

10. The PCI-e system of claim 9, further comprising:
    allocating a first set of addresses to a node of a first address in a sub-tree to the first interconnection;
    allocating a second set of addresses to a node of a second address in a sub-tree to the second interconnection;
    programming a single address of the first address in a first translation register with addresses of the first address and a corresponding first set of addresses of the sub-tree of the first interconnection;
    programming a single address of the second address in a second translation register with addresses of the second address and a corresponding second set of addresses of the sub-tree of the second interconnection; and
    using the first and second translation registers, translating addresses of packets arriving on either side of the NTB between the first and second interconnections to either the first or second addresses of the sets of first and second addresses.

11. A method of assigning addresses and propagating nodes of a topology tree of a peripheral component interconnect express PCI-e system, the method comprising:
    assigning addresses at each level of the PCI-e system, the assigning comprising:
    traversing, at a level and in a breadth direction, down-link couplings to an interconnection of the PCI-e system;
    determining, at the level, which of the down-link couplings are coupled to nodes, and incrementing an update counter based on detection of an additional depth level; and
    assigning contiguous addresses, at the level, to nodes of determined down-link couplings having nodes;
    propagating the level of the PCI-e system, the propagating comprising:
    traversing, at the level and in a depth direction, down-link couplings to the interconnection of the PCI-e system;
    determining, at the level, which of the down-link couplings are coupled to other interconnections in the depth direction; and consecutively proceeding, in the depth direction, to a next level of down-link coupling of a next interconnection; and alternately repeating the assigning and the propagating until the nodes are assigned addresses within the PCI-e system, wherein, if there are no down-link couplings at the level, proceeding up to a previous level based on the update counter to ascertain additional down-link couplings.

12. The method of claim 11, wherein the alternately repeating prevents gaps in address space by resulting in consecutive address assignments being assigned for nodes.

13. The method of claim 11, wherein the alternately repeating results in a substantially minimal allocation of address space.

14. The method of claim 11, wherein the interconnection comprises one of a switch and a port for coupling downlinks.

15. The method of claim 11, wherein the next level comprises one of an upper and a lower level of a next interconnection.

16. The method of claim 11, wherein the level comprises an initial level of the interconnection coupled to a root connection of the topology tree.

17. The method claim 14, wherein the assigning and the propagating performed on nodes commencing at a first level and ending at the first level results in address assignment for tree branches of the topology tree.

* * * * *